United States Patent
Delgado Acarreta et al.

(10) Patent No.: US 11,415,383 B2
(45) Date of Patent: Aug. 16, 2022

(54) WEAPON SAFETY SYSTEM

(71) Applicant: RADE TECNOLOGÍAS, S.L., Saragossa (ES)

(72) Inventors: Raúl Delgado Acarreta, Saragossa (ES); Rubén Robles Pérez, Saragossa (ES); Andrés Yago Loscos, Saragossa (ES); Diego Lorente Algora, Saragossa (ES); José Cuesta Álvarez, Saragossa (ES)

(73) Assignee: Rade Tecnologías, S.L., Saragossa (ES)

( * ) Notice: Subject to any disclaimer, the term of this patent is extended or adjusted under 35 U.S.C. 154(b) by 132 days.

(21) Appl. No.: 16/963,687

(22) PCT Filed: Jan. 22, 2018

(86) PCT No.: PCT/ES2018/070050
§ 371 (c)(1),
(2) Date: Jul. 21, 2020

(87) PCT Pub. No.: WO2019/141885
PCT Pub. Date: Jul. 25, 2019

(65) Prior Publication Data
US 2021/0080209 A1   Mar. 18, 2021

(51) Int. Cl.
*F41A 17/08* (2006.01)
*F41A 19/15* (2006.01)

(52) U.S. Cl.
CPC ............. *F41A 17/08* (2013.01); *F41A 19/15* (2013.01)

(58) Field of Classification Search
CPC .......... F41A 17/08; F41A 17/10; F41A 17/12; F41A 19/15
See application file for complete search history.

(56) References Cited

U.S. PATENT DOCUMENTS 2,304,566 A * 12/1942 Haberlin ................. F41A 17/08
89/37.17
2,472,136 A * 6/1949 Whitlock ................ F41A 17/08
342/67

(Continued)

FOREIGN PATENT DOCUMENTS

AU    444844 B2    1/1974
DE    2505604 A1   8/1976
(Continued)

OTHER PUBLICATIONS

International Search Report dated Oct. 9, 2018 re: Application No. PCT/ES2018/070050, pp. 1-2, citing: AU 444 844 B2, DE 37 13 453 A1 and US 2009/0075241 A1.

(Continued)

*Primary Examiner* — Joshua E Freeman
(74) *Attorney, Agent, or Firm* — The Webb Law Firm

(57) ABSTRACT

A weapon safety system with a target and a weapon with an automated lock. Each target is associated with an emitter which transmits a clearance signal that encodes an identifier. The encoded identifier may release the automated lock when received by a receiver attached to the weapon. In order to restrict the positions and orientations from which the weapon can fire to those surrounding the desired targets, shooting is enabled and the automated lock is released, when the following conditions are met:
the clearance signal is received by the receiver, so that the receiver is within a first enablement area generated by a first aperture in the emitter;
a measured optical power is above a predefined threshold; and
the encoded identifier is validated.

17 Claims, 5 Drawing Sheets

(56) References Cited

U.S. PATENT DOCUMENTS

| | | | | |
|---|---|---|---|---|
| 3,400,393 | A | * | 9/1968 | Ash .................. F41A 17/08 89/134 |
| 3,703,845 | A | * | 11/1972 | Griew ................ F41A 17/08 89/134 |
| 4,170,077 | A | * | 10/1979 | Pardes ............... F41G 3/2627 434/22 |
| 4,470,817 | A | * | 9/1984 | Diehl ................. F41A 17/08 89/134 |
| H538 | H | * | 11/1988 | Betzold ..................... 89/134 |
| 5,456,157 | A | * | 10/1995 | Lougheed .......... F41G 3/08 89/134 |
| 6,415,542 | B1 | * | 7/2002 | Bates ................. F41A 17/08 42/70.11 |
| 6,977,593 | B2 | * | 12/2005 | Schmedemann ..... F41G 3/26 340/5.5 |
| 8,127,482 | B2 | * | 3/2012 | O'Shaughnessy .... F41A 17/063 42/70.11 |
| 9,250,030 | B2 | * | 2/2016 | Henry ................ F41A 17/063 |
| 9,810,498 | B1 | * | 11/2017 | Winiecki ............ F41A 17/08 |
| 2009/0075241 | A1 | * | 3/2009 | Ha ..................... F41G 3/2661 434/21 |
| 2020/0300569 | A1 | * | 9/2020 | Apostolopoulos .... F41A 17/063 |

FOREIGN PATENT DOCUMENTS

| | | |
|---|---|---|
| DE | 2940513 A1 | 4/1981 |
| DE | 3713453 A1 | 11/1988 |
| DE | 10227093 A1 | 2/2004 |

OTHER PUBLICATIONS

Written Opinion dated Oct. 9, 2018 re: Application No. PCT/ES2018/070050, pp. 1-8, citing: AU 444 844 B2, DE 37 13 453 A1 and US 2009/0075241 A1.

* cited by examiner

WEAPON SAFETY SYSTEM

TECHNICAL FIELD

The present disclosure has its application within the weapon safety sector, and more specifically, in the area engaged in preventing weapons, more particularly firearms, from being fired when pointing outside a predetermined area.

BACKGROUND

Preserving safety in shooting ranges where users train with real firearms is a challenging task, as dire consequences may result from weapon misuse, either caused by lack of experience or by ill intentions. One of the most sought-after approaches to prevent a weapon from being fired outside the area designated for the targets is to incorporate an automated lock which is only released when the weapon is appropriately pointed.

For example, patent document U.S. Pat. No. 3,703,845 presents a safety system for arms where a transmitter installed in the target emits a continuous signal that needs to be detected at the weapon to enable firing. If this signal is not detected, the weapon trigger can be used, but the automated lock prevents the striker from being activated. When the signal is detected by a receiver attached to the weapon, it is considered that the firearm is facing the general direction of the target, the lock is released, and the trigger can activate the striker. By having the firearm locked by default, safety is guaranteed outside the designated shooting area. A similar approach is taken in patent document DE2505604A1, where an emitter protected by a cylindrical cover emits a clearance signal in a horizontal direction. The weapon is locked by default, and said lock is only released when the clearance signal is received at a detector attached to the weapon.

However, this approach presents two main limitations. Firstly, since the signal transmitted from the target area does not encode any information, it can be easily tampered by any other light source with a similar wavelength, and cannot restrict weapon use to specific shooting lanes. Secondly, since the weapon can be fired from any position and orientation where the clearance signal is received, it is challenging to limit these allowed positions and orientations to those facing the target and its immediate surroundings of the target. That is, it is possible that even when pointing outside the targets, some optical power associated to the clearance signal is still received, improperly unlocking the weapon. As a consequence, the green-lit area may not be defined properly or sharply enough.

Patent document DE10227093A1 builds upon this scheme by incorporating a code or pattern to the clearance signal, which must be validated at a receiver attached to the firearm. This prevents the aforementioned tampering, although by incorporating an omni-directional emitter and a photodetector located in an open cone-shaped region, the allowed shooting directions and distances are very broadly defined. That is, shooting in the general direction of the targets is enabled, but it is not restricted to the specific area covered by said targets. As a consequence, users may shoot into other lanes, or in directions far enough from the targets as to result dangerous, but where the clearance signal is still received.

In another example, patent document DE2940513A1 presents a more complex system that achieves a greater restriction in the shooting direction by incorporating two emitters in each target, each emitting an IR beam with a different codification. Only when both beams are detected and validated, the automated lock is released and the firearm can be fired. However, this option still presents some limitations relating to the sharpness of the definition of the area where shooting is allowed, and the increased complexity may result in slower response times, that is, the time interval between the instant when the firearm is appropriately pointed until shooting is enabled may be too large, hindering users experience. Also, another undesirable situation may occur when a user aims at a target and is enabled to shoot, if the user quickly gets out of the enable area and shoots, an accident may happen.

In conclusion, despite the different proposed approaches and their associated improvements, there is still the need in the state of the art of a weapon safety system (specially for shooting ranges) that allows to restrict weapon shooting to the area designated for the targets in a sharp, robust and rapid manner.

SUMMARY

The current disclosure solves all the aforementioned problems by disclosing a weapon safety system for shooting ranges that combines spatial limitation of a clearance signal and target information logically encoded in said clearance signal. By combining hardware-defined allowed shooting regions, optical power measurements and software-based decision capabilities, a greater security and control over the weapon use is achieved. Furthermore, a quick and robust system response is preserved.

Within the present disclosure, by weapon it is meant any small arm or light weapon, such as a firearm, gun, shotgun, airgun, machine gun, pistol, rifle, revolver, etc. and also non-lethal weapon or archery weapon.

The present disclosure relates to a weapon safety system, which comprises:
  a target;
  a weapon;
  an emitter located in a surrounding region of the target configured to emit a clearance signal; and
  a receiver attachable to the weapon;
the weapon comprising an automated lock, which is configured to prevent the weapon from being fired.

According to a first aspect of the disclosure, the emitter comprises:
  a light emitting diode adapted to transmit the clearance signal with an encoded identifier; and
  a first radiation-blocking element comprising a first aperture which restricts emission of the light emitting diode to a first beam; the first beam defining a first enablement area at the receiver in which the clearance signal is received in the receiver;
the receiver comprises:
  a photodetector, adapted to receive and to measure an optical power of the clearance signal; the light emitting diode and the photodetector being aligned in an optimal shooting position in which the weapon is aiming at the target; and
  receiver control means adapted to release the automated lock and to enable shooting when the following conditions are met:
    the clearance signal is received by the receiver so that the receiver is within the first enablement area;
    the measured optical power is above a predefined threshold; and
    the encoded identifier is validated.

The weapon safety system of the disclosure may be used, for example, in a shooting or firing range; or in any other facility (either indoors or outdoors) designed for archery or weapons practice. So, the weapon safety system comprises an emitter associated to at least one target of the shooting range, and a receiver associated to a weapon of said shooting range; preferably the relationship emitter-target is 1:1, but it is also possible that one emitter is associated to two or more targets.

The emitter is disposed in an area near the target; the emitter transmits the clearance signal, which preferably is a non-visible clearance signal (such as an infrared, IR), with the encoded identifier associated to said emitter (and therefore, to its associated target). The identifier encoding is preferably performed by emitter control means (such as a micro-controller), which is adapted to modulate the clearance signal with the encoded identifier, preferably implementing an amplitude-shift keying (ASK) modulation, such as on-off keying (OOK). The receiver is adapted to be attachable to the weapon and connectable to an automated lock that prevents the weapon from shooting by default, until shooting is enabled by the receiver. The clearance signal can be transmitted from the emitter periodically, in a continuous manner or upon being commanded to start such transmission.

The emitter can be located right above or right below its associated target, or at any point between the target and the weapon.

The emitter further comprises a first radiation-blocking element with a first aperture, which restricts emission of the light emitting diode (LED) to the first beam, which in some embodiments is in the range of non-visible light, so as not to disturb the weapon user's vision. This radiation-blocking element can be any physical element which blocks emission in all angles except those encompassed by the aperture. For example, the radiation-blocking element can be a lid with a central aperture, or a hollow cylinder, both in any material significantly blocking preferably non-visible radiation, (it may be infrared) radiation. The first aperture may have any suitable shape for blocking light emission to the first beam, which generates the first enablement area at the receiver, in which the clearance signal is received. The first aperture can be circular-shaped, thereby providing symmetry for left-hand and right-hand users; also, the circular shape of the first aperture provides the same enabling range in all directions, so that the weapon user can move (once enabled to fire) the same distance in all directions from the position aiming at the center of the target. The first aperture may comprise any kind of filter or protection, preferably blocking or reducing radiation outside the emission range, which may preferably be in the non-visible range.

The receiver control means of the receiver is adapted to release the automated lock of the weapon upon reception of the clearance signal, upon validating the encoded identifier (by demodulation at the receiver, when the encoded identifier was modulated into the clearance signal by the emitter) and upon checking that the measured optical power is above a predefined threshold. This way, it is guaranteed that shooting of the weapon takes place when the clearance signal is only detected at approved weapon position and orientations (that is, when the weapon is in a safe position for shooting).

In some embodiments, the receiver further comprises a second radiation-blocking element, with a second aperture, restricts reception of the photodetector to a second beam; this second beam generates a second enablement area at the target. In this case, the receiver control means is adapted to release the automated lock if, additionally, the weapon is aiming at the second enablement area. That is, only radiation of the clearance signal coming from given angles is introduced through the second aperture and reaches the photodetector. The second aperture may also have any suitable shape for blocking light reception so as to create the required second enablement area, where shooting in the general direction of the target is enabled. In some embodiments, this second aperture may also be circular-shaped, also providing symmetry for any user; the second aperture may also comprise any kind of filter or protection, preferably blocking or reducing radiation outside the emitted range.

The second aperture may also have a shape of a circular segment having as lower boundary an arc embracing more than 200°, preferably more than 230°, thereby protecting the emitter from being shot.

In some embodiments, in the optimal shooting position the optical power measured of the detected clearance signal is maximum; thus, deviations from said optimal shooting position and orientation lead to a reduction in the detected optical power, as a lesser fraction of the transmitted clearance signal verifies the geometrical conditions to reach the photodetector.

In some embodiments, the receiver control means of the emitter is adapted to release the automated lock:
  if the measured optical power exceeds a first threshold, or
  if the measured optical power exceeds a second threshold, which is lower than the first threshold, and a preceding measurement of the optical power exceeds the first threshold.

The difference of measured optical power between the first and the second threshold can be of 10%.

In this particular case, the decision to release the automated lock (thereby enabling shooting), considers a central approved region, and a concentric hysteresis region, where the weapon can be fired when deviating from the central region, but not when coming from an external area where shooting is forbidden. That is, in addition to the previous conditions, the automated lock is only released if the measured optical power exceeds a first threshold (associated to the central region); or if said measured optical power exceeds a second threshold (lower than the first threshold and associated to the hysteresis region) after having exceeded the first threshold in the preceding measurement of optical power.

In some embodiments, the first aperture is disposed perpendicularly to a vertical angle (that is, which respect to a horizontal plane) formed by an imaginary line separating the emitter and the receiver when the weapon is in the optimal shooting position.

The disclosed weapon safety system is compatible with any other safety element known in the state of the art that can be integrated in the weapon or in the receiver, as well as with any other condition implemented by the receiver control means. For example, the receiver may further incorporate an accelerometer, whereas the receiver control means may incorporate additional conditions for lock release, such as aborting shooting permission when sudden movements or rotations are detected by the accelerometer.

In some embodiments, all emitters in a shooting range share the same encoded identifier, and all receivers of all weapons are configured to release the automated lock when detecting said encoded identifier (provided the measured optical power is above the predefined threshold so as to guarantee that the weapon is appropriately directed).

In the case the clearance signal is not a continuous information-less emission, but in the case of a periodic transmission including target information, more complex conditions in the decision algorithm leading to releasing the automated lock can be imposed, hence being more robust against weapon misuse. According to another possible system embodiment, each emitter transmits a different encoded identifier, and each receiver of each weapon is configured to release the automated lock when receiving a specific identifier or a given set of identifiers. This enables, for example, to restrict the use of a given weapon to a given lane of the shooting range. Furthermore, in the case of sequential targets within several lanes, each emitter of each target in each lane may encode a different identifier. The receiver may be then configured to release the automated lock only if the identifiers associated to the different lanes are received in a predetermined sequence or order.

In any of the previous cases, the identifier encoded by each emitter is preferably selected manually through a plurality of operable switches, facilitating system reconfiguration by the shooting range operators. Nevertheless, any other technique apt to input the identifier, known in the state of the art may be applied, such as wired or wireless data connection to a centralized control system.

Regarding the location of the emitter within the shooting range, in a first option, the emitter is disposed facing the receiver (when the receiver attached to said weapon is in an optimal shooting position predefined by design). However, in order to protect the emitter from any accidental damage, in a second option, the emitter is disposed facing a reflector that in turn directs the LED emission towards the receiver. This second disposition enables to further protect the emitter, for example, covering its back with a protective element, or installing it in a section of the shooting range with a lower floor. In either case, the emitter can be located right under the target, or it can be located at any intermediate position between the target and the weapon user.

The weapon safety system of the present disclosure therefore guarantees that weapons are only allowed to shoot at pre-approved targets, in a manner that prevents any accidental or ill-intentioned misuse. Furthermore, the combination of the spatial restrictions provided by the first beam, and by the second beam (in the embodiments comprising a second aperture in the receiver), and the identifier encoding, in addition to being versatile, enables easily-reconfigurable dispositions that further increase user safety, such as sequential targets verification, specific weapons associated to a shooting lane, etc. All of this is done in an efficient manner which guarantees very short response times between the instant that the weapon is in an adequate position (and orientation, if the accelerometer is included), and the instant where the automated lock is released. Additional advantages and features of the disclosure will become apparent from the detailed description that follows and will be particularly pointed out in the appended claims.

The different aspects and embodiments of the disclosure defined in the foregoing can be combined with one another, as long as they are compatible with each other.

Additional advantages and features of the disclosure will become apparent from the detailed description that follows and will be particularly pointed out in the appended claims.

BRIEF DESCRIPTION OF THE DRAWINGS

For the purpose of aiding the understanding of the characteristics of the disclosure, according to a preferred practical embodiment thereof and in order to complement this description, the following figures are attached as an integral part thereof, having an illustrative and non-limiting character.

DETAILED DESCRIPTION OF THE DRAWINGS

In the following detailed description, the embodiments of the disclosure are described for the particular scenario where the emitter is located under the target, and hence the receiver is located under the weapon when attached to it. However, the emitter may be located over the target in particular embodiments of the disclosure, and the emitter be attached on top of the weapon, following the same design consideration described herein, straightforwardly adapted to said disposition. Furthermore, the emitter may be disposed in an intermediate position between the target and the weapon, instead of right below said target.

Figure 1:
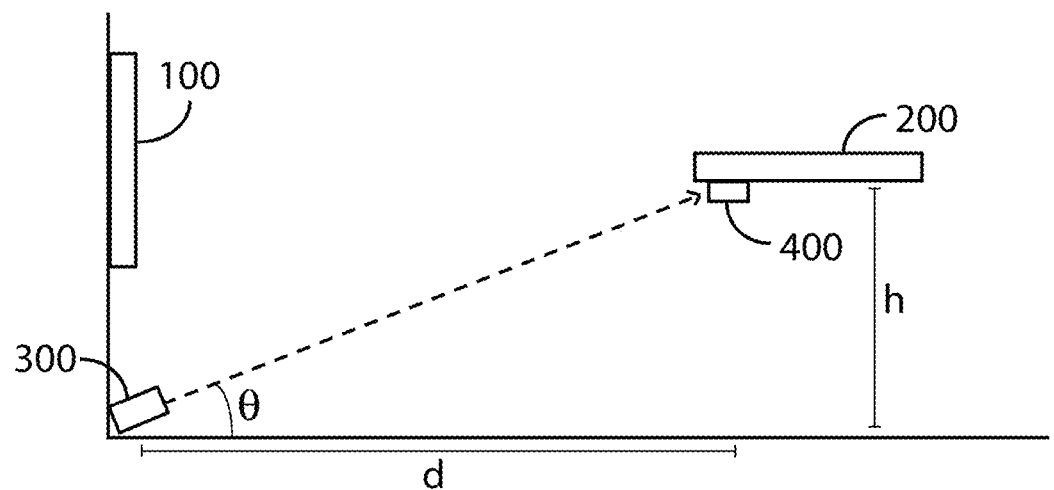
FIG. 1 schematically depicts a first disposition of the safety system of the disclosure where the emitter faces the receiver directly, according to a preferred embodiment thereof.

FIG. 1 schematically presents a first possible disposition of the elements of the safety system of the disclosure within a shooting range comprising a target 100 and a weapon, in this case, a firearm 200. An emitter 300 transmitting a clearance signal is disposed under each target 100, whereas a receiver 400 has been attached to each firearm 200. In this first configuration, the emitter 300 is directly facing the receiver 400 when the firearm 200 is in an optimal shooting position in which the firearm 200 is aiming at the target 100.

The emitter 300 and the receiver 400 are separated by a horizontal distance d and a vertical distance h, which separating distance defines a vertical angle θ. The particular values of the vertical distance h, the horizontal distance d and the vertical angle θ, may vary depending on the particular embodiment of the firearm safety system and the shooting range, or the specific area where the firearm safety system of the disclosure is used.

The vertical angle θ is made different than zero. That is, the emitter 300 and the receiver 400 are not in the same horizontal plane, hence guaranteeing emitter 300 safety when shooting. Furthermore, the vertical angle θ is preferably comprised between 5° and 10°, and more preferably, between 6° and 8°.

In a typical example of a shooting range, the horizontal distance d is 12.5 m, the vertical distance h is 1.5 m and the vertical angle θ is 7°. In others example of shooting ranges, the vertical distance h is also 1.5 m, the horizontal distance d can be 25 m, 50 m and also 100 m, in which cases the vertical angle θ is 3.5°, 1.75° and 0.875°.

Figure 2:
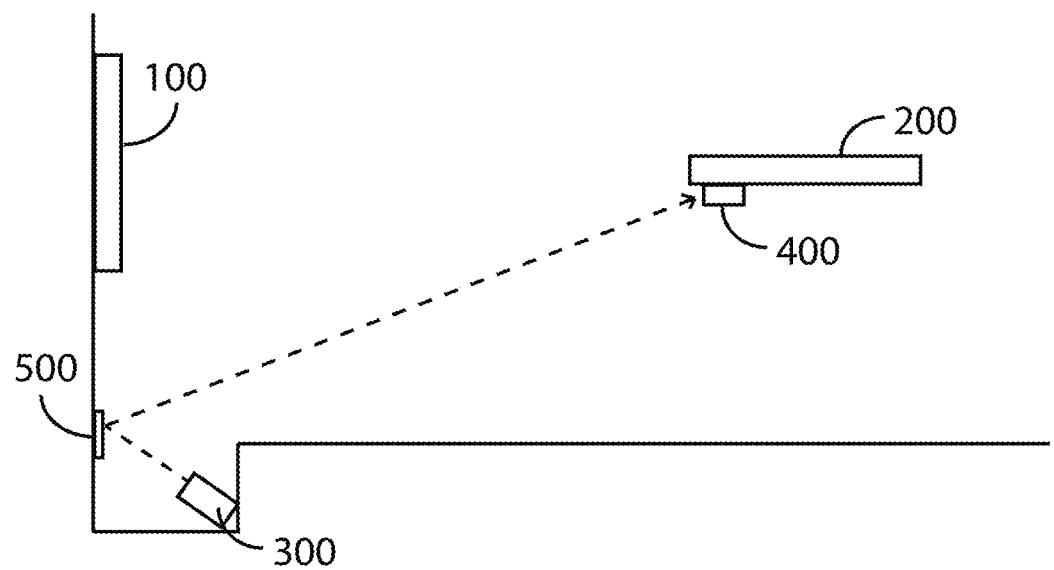
FIG. 2 shows a second disposition of the safety system of the disclosure where the emitter is protected by using a reflector, according to a preferred embodiment thereof.

FIG. 2 schematically presents another possible disposition of the elements of the firearm safety system of the disclosure. In this example, the emitter 300 is protected in a region with a lower floor. In order to transmit the clearance signal to the receiver, the system comprises a reflector 500 installed below the target 100, that is, a substantially reflective surface in the IR range used to transmit the clearance signal, which reflects the emitter 300 emission towards the receiver 400.

Figure 3:
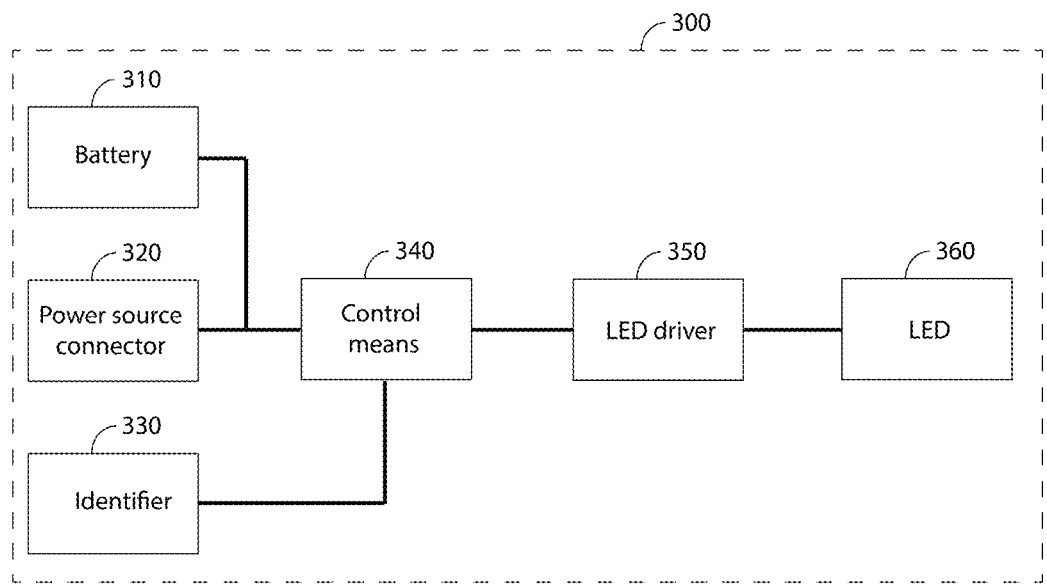
FIG. 3 presents the main elements of the emitter, according to a preferred embodiment of the disclosure.

FIG. 3 shows the main internal elements of the emitter 300 according to a possible embodiment thereof. The emitter 300 is fed by internal and/or external power sources such as an internal battery 310 or a connector 320 to an external power source. The emitter 300 comprises emitter control means 340, implemented in a microcontroller or any other kind of programmable hardware, which generates the clearance signal—in the present example, a periodic clearance signal—that is transmitted by an infrared LED 360 controlled by an LED driver 350. An infrared LED is used in this example, but other LEDs are possible, preferably emitting non-visible light, so as not to affect the user vision when shooting. The emitter control means 340 encodes an identifier 330 in the periodic clearance signal, and said signal is modulated in an amplitude-shift keying ASK modulation, such as on-off keying OOK. This simplifies signal demodulation at the receiver 400 and improves response time. Nevertheless, other modulations known in the state of the art may be used in particular embodiments of the disclosure. The LED emission range in this example is 1150 mW, but it can also be of 1600 mW.

In this embodiment, the emitter 300 always transmits the same message, and does not expect any response from the receiver 400, therefore optimizing response time. Although additional information may be encoded in the clearance signal along with the identifier 330, a simple message with said identifier 330 and minimal additional information is preferred to avoid processing delays.

Figure 4:
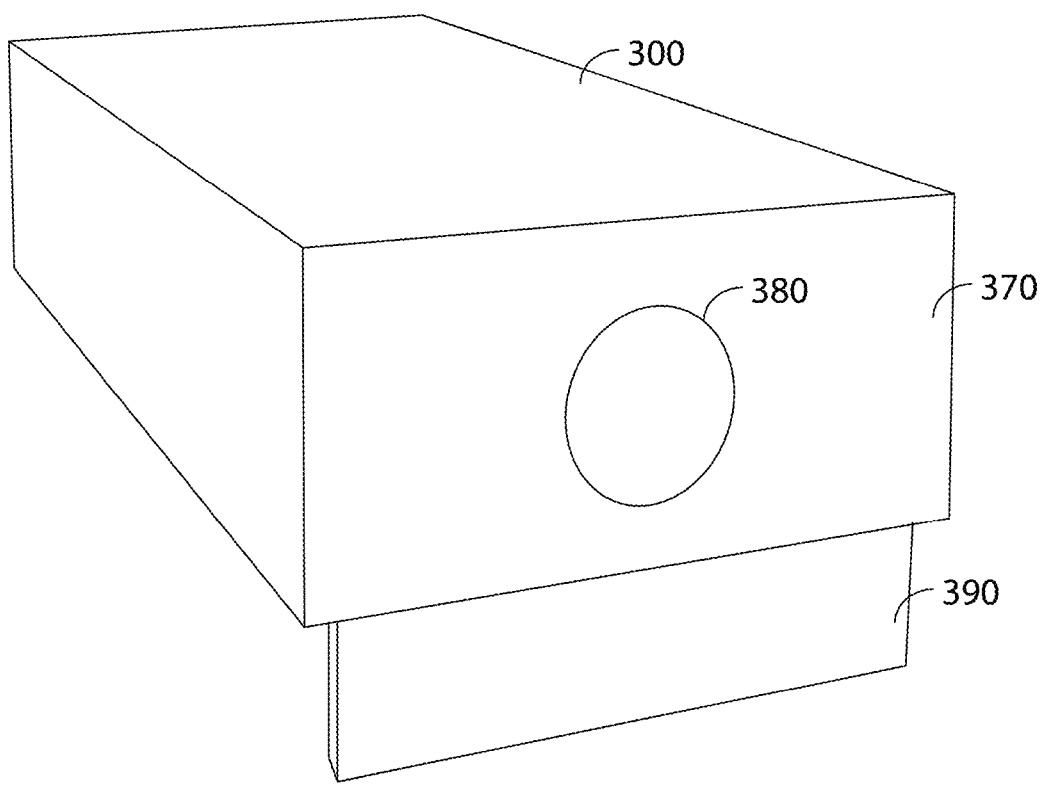
FIG. 4 is a schematic perspective view that illustrates the radiation-blocking element of the emitter, according to a preferred embodiment of the disclosure.

FIG. 4 schematically presents the external elements of the emitter 300 according to a preferred embodiment thereof. The emitter comprises a first radiation-blocking element 370, such as a lid, wall or parasol; in the illustrated embodiment, the first radiation-blocking element has a first aperture 380, in the shown example having a circular shape. That is, radiation from the LED 360 is blocked at all angles except those encompassed by the first aperture 380. Additionally, the emitter 300 may comprise a base 390 in its front end that orientates the first aperture 380 in perpendicular to the vertical angle θ, thereby connecting the emitter 300 and the receiver 400. This first aperture 380 of the emitter 300 is substantially perpendicular to the vertical angle θ, hence maximizing an optical power emission of the clearance signal transmitted by the emitter in the optimal shooting position.

Figure 5:
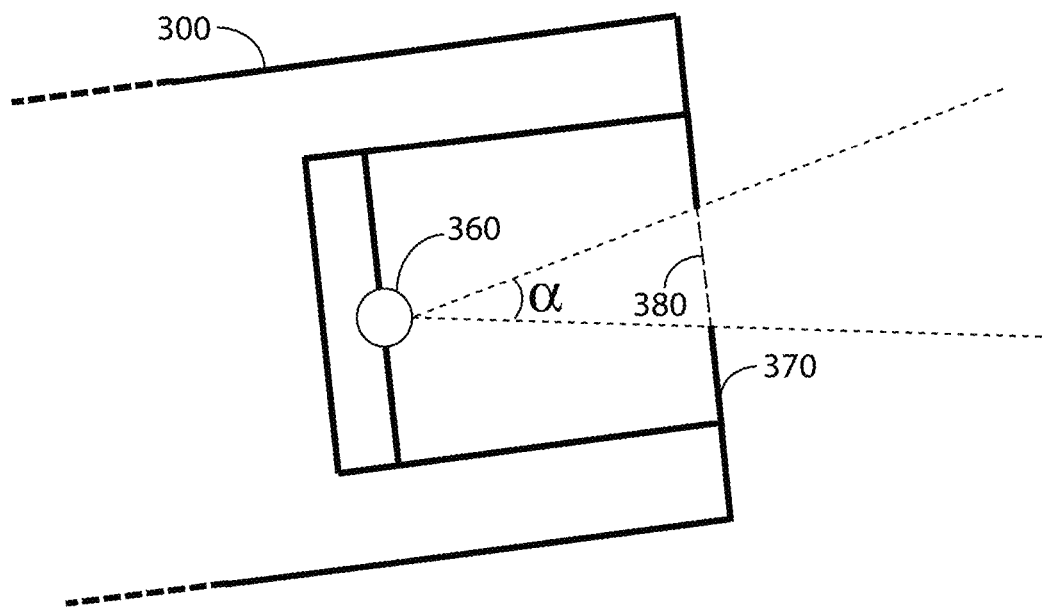
FIG. 5 is a schematic section view of the emitter, according to a preferred embodiment of the disclosure.
Figure 8:
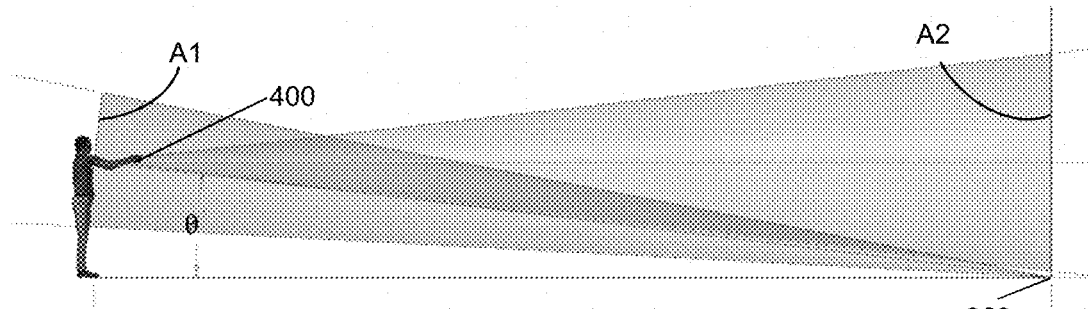
FIG. 8 schematically illustrates the enablement areas generated by the emitter and the receiver.

FIG. 5 illustrates the operation of the spatial limitation applied to the LED 360 radiation of the emitter 300 according to a possible embodiment thereof. Although the LED 360 radiates in an omni-directional manner, only radiation within a first angular range α leaves the emitter 300, which generates a first enablement area A1 at the receiver 400 (cf. FIG. 8) in which the clearance signal is received at the receiver 400, thereby meeting one of the conditions for enabling shooting. The first angular range α is adjusted so as to set the desired first enablement area A1; the first angular α can be adjusted by modifying the width of the first aperture 380 and/or the distance between said first aperture 380 and the LED 360. In the case of the first aperture 380 being circular, a cone-shaped emission is achieved.

In case of the horizontal distance d being 12.5 m, the first angular range α is 8°, and the first enablement area A1 defined at the receiver 400 (that is, in the area where the firearm user is located) has a circular shape centered at the receiver 400, with a diameter of 1.75 m. The width of a lane in a shooting gallery is usually 1.5 m. With this arrangement, at the border of a lanes it would be possible to receive signals from two emitters of adjacent lanes; but, since the clearance signal is coded with the encoded identifier, shooting from those border areas of adjacent lanes is prevented. Another option would be to reduce the first angular range α.

Figure 6:
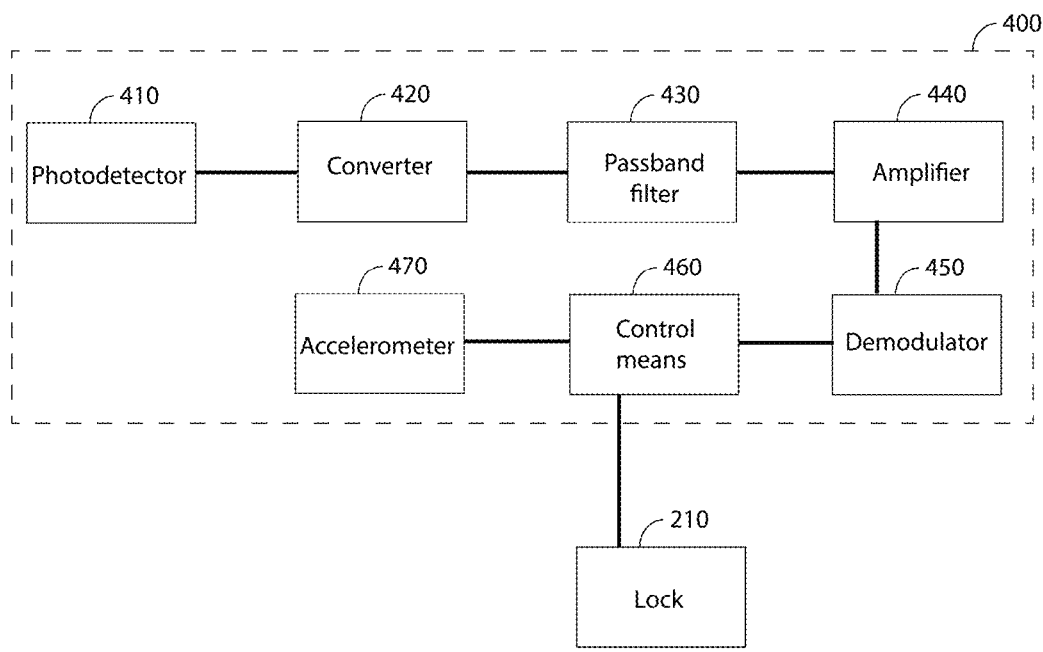
FIG. 6 presents the main elements of the receiver, according to a preferred embodiment of the disclosure.

FIG. 6 shows in greater detail the internal elements of the receiver 400 according to a preferred embodiment thereof. The receiver 400 comprises a photodetector 410, sensitive to IR, that detects the clearance signal sent by the emitter when the receiver 400, and thus the firearm 200, is within the first enablement area A1. The photodetector not only determines whether said clearance signal is received or not, but it also provides a measurement of the optical power of said signal, enabling this information to be used in the algorithm that decides when the automated lock 210 is released. The signal detected at the photodetector 410 is converted from optical power to voltage at a converter 420 stage, and conditioned by a passband filter 430 and an amplifier 440. Then, a demodulator 450 demodulates the amplified signal and retrieves the identifier 330 encoded in the clearance signal. The identifier 330 is validated at receiver control means 460 which decides if the automated lock 210 is released according to at least, said encoded identifier 330 and the optical power measurement of the photodetector 410.

The particular design of the automated lock 210 can be selected from any known technology of the state of the art, hence falling outside the scope of the present disclosure. That is, the receiver 400 generates a control signal that determines whether the automated lock 210 is released, regardless of the particular automated lock 210 design. Furthermore, any known safety element that prevents firearms from being fired towards undesired directions, such as an accelerometer 470 may be incorporated into the receiver 400 and its measurements taken into consideration within the decision algorithm of the receiver control means 460.

Figure 7:
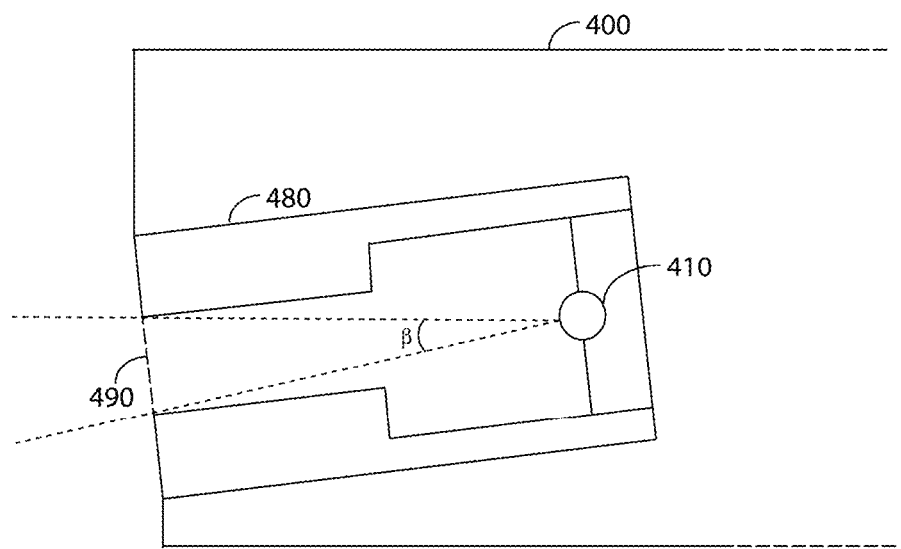
FIG. 7 is a schematic section view of the receiver, according to a preferred embodiment of the disclosure.

FIG. 7 illustrates the operation of the spatial limitation applied to the photodetector 410 detection of the receiver 400 according to a possible embodiment thereof. The receiver comprises a second radiation-blocking element 480, such as a lid, wall or parasol; in the illustrated embodiment, the second radiation-blocking element has a second aperture 490, in the shown example having a circular shape. Although the receiver 400 may receive incoming radiation from a wider range, only radiation within a second angular range arrives at the photodetector 410, therefore meeting one of the conditions for enabling shooting. This second angular range β generates a second enablement area A2 at the target 100 in which, if all the conditions are met, shooting is enabled (cf. FIG. 8). The second angular range β is adjusted so as to set the desired second enablement area A2; the second angular β can be adjusted by modifying the width of the second aperture 490, and/or by modifying the distance between said second aperture 490 and the photodetector 410. In the case of a circular second aperture 490, a cone-shaped detection region is achieved.

In case of a shooting range in which the horizontal distance d being 12.5 m and the first angular range α is 8°, the second angular range β is 13° and the second enablement area A2 defined at the target 100 (that is, in the area where the firearm user is located) has a circular shape centered at the center of the target 100 with a diameter of 2.84 m. As more clearly shown in FIG. 8, with this specific configuration, firing at the emitter is prevented, since the emitter 300 is located 1.50 m below the center of the target 100, which is outside the second enablement area A2 generated by the receiver 400.

If, still using a circular-shaped second aperture 490 in the receiver 400, the diameter of the second aperture 490 is doubled (or the photodetector 410 is moved outwards), then the second angular range β is 23° and the second enablement area A2 defined at the target 100 has a diameter of 4.96 m, which does not prevent the emitter 300 from being shot, since it is within the enabled range.

When the firearm 200 is in its optimal position and orientation, the light emitting diode 360 and the photodetector 410 are aligned, and the firearm 200 is aiming at the target 100. Therefore, a maximum amount of radiation from the LED 360 arrives at the photodetector 410. As the weapon moves away from said position, or changes its orientation away from the target, a greater part of the radiation will fall outside the second aperture 490, or enter said second aperture 490 with an angle too large to reach the full depth until the photodetector 410. As a consequence, the measured optical power will decrease, until reaching a threshold that indicates that shooting is no longer permitted.

Figure 9:
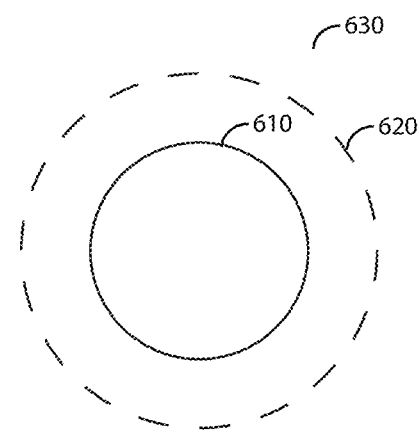
FIG. 9 illustrates two different second enablement areas A2, in case of using hysteresis conditions in the algorithm deciding release of the automated lock.

FIG. 9 exemplifies the use of hysteresis conditions in the algorithm that determines whether the automated lock 210 should be released or not, according to a preferred embodiment thereof. The three concentric areas shown in FIG. 9 represent the second enablement areas as seen at the target 200 area, in case the algorithm deciding release of the automated lock 210 takes into account deviations from the optimal position and orientation for shooting the firearm. According to this embodiment, in a central region 610 shooting is always enabled. Then, in an outer hysteresis region 620 shooting is only enabled if the firearm 200 was previously pointing at the central region 610, but not if previously pointing outside the hysteresis region 620 and the central region 610; thus, a user can shoot at the hysteresis region 620 if the user was previously shooting at the central region. Finally, a forbidden region 630 is shown, where the automated lock 210 in never released. The second enablement area A2 is formed by the central region 610 plus the hysteresis region 620. Each region is defined by a threshold applied to the measured optical power of the clearance signal. That is, when the measured optical power exceeds a first threshold, the firearm 200 aims the central region 610 and the automated lock 210 is released (considering that the encoded identifier is validated and any other safety condition is met). When the measured optical power exceeds a second threshold, lower than the first threshold, the firearm 200 aims the hysteresis region 620, and the automated lock 210 is only released if coming from the central region 610, that is, if the previous optical power measurements exceeded the first threshold. If the measured optical power is lower than the second threshold, the automated lock 210 is not released under any circumstance.

Figure 10:
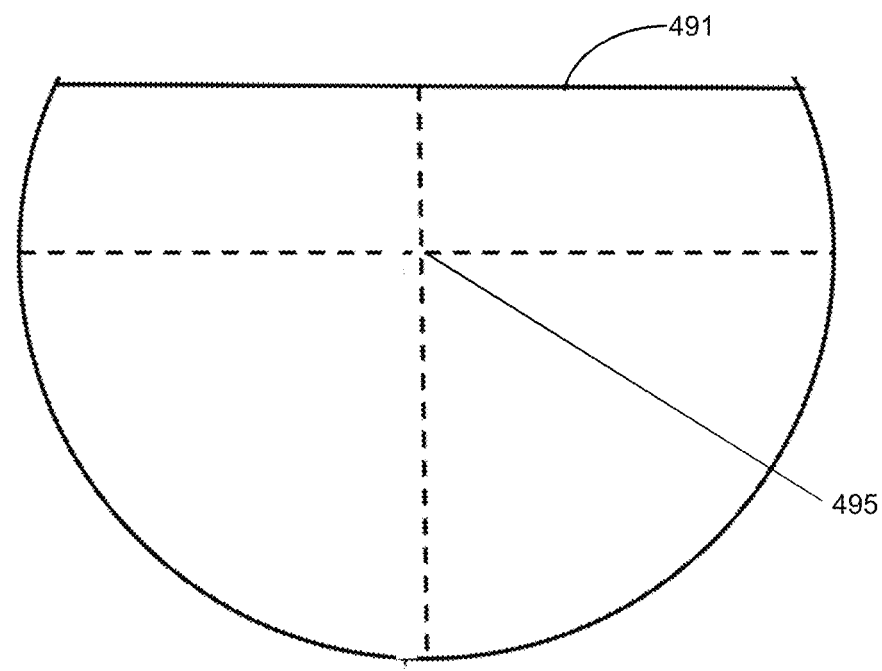
FIG. 10 shows another possible embodiment of the second aperture in the receiver.
Figure 11:
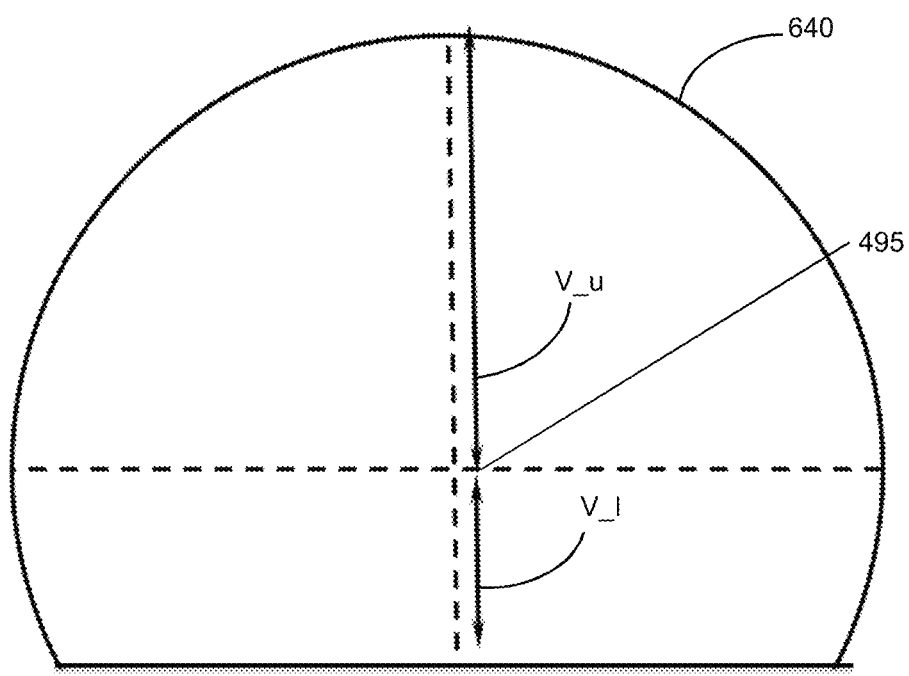
FIG. 11 shows the second enablement area viewed at the target generated by the second aperture of FIG. 10.

FIG. 10 is a schematic view of another possible embodiment of the second aperture 491 in the receiver. As shown, the second aperture 491 has a shape of a circular segment having as lower boundary an arc embracing around 240°. Point 495 is the point of the second aperture 491 coinciding with the center of the target 100. FIG. 11 shows the second enablement area 640 as viewed at the target 100 generated by the second aperture 491 of FIG. 10. Point 101 represents the center of the target 100.

As in the previous case with the circular-shaped second aperture 490, as long as the receiver 400 (that is, the firearm 200) is within the first enablement area A1 (which is still also a disk), shooting may be enabled (if the remaining conditions thereof are met). If the receiver 400 is outside the first enablement area A1, shooting is not enabled, regardless of the angle at which the receiver is aiming at the target 100.

So, considering the receiver 400 is within the first enablement area A1:

shooting may be enabled (and the automated lock 210 will be released if the remaining conditions for enabling shooting are met) if the firearm 200 is aiming at the target 100 with an angle comprised within the second angular range β; and shooting is not enabled (and the automated lock 210 is not released, even if the remaining conditions are met) if the firearm 200 is aiming at the target 100 with an angle which is greater than the second angular range β, that is, it is a greater angle than allowed by the second aperture.

In this case, the second angular range β is not omnidirectionally symmetrical. It has a horizontal symmetrical component of 22.5°, and a vertical component of 17.75°. The vertical component is not symmetrical, and in fact, it has a lower component V_l of 6.5° and an upper component V_u of 11.25°. This is due to the fact that when the firearm 200 is moved and/or rotated towards one side (whichever way), the opposite side is the one that shadows the photodetector 410. As shown in FIG. 11, with this specific configuration firing at the emitter is prevented: when the firearm 200 aims at the target 100 with an angle greater than the second angular range β, the emitter 300 is not within sight (the emitter is far below the horizontal lower line in FIG. 11): in the present case, if the firearm 200 aims downwardly at the target with an angle greater than 6.5°, the upper horizontal wall of the second aperture 490 will shadow the photodetector 410, and shooting is not enabled.

The second aperture 491 can be implemented as a circular aperture with a sliding lid, which is vertically movable so as to cover an upper circular segment of the circular aperture.

Other embodiments of the disclosure may include apertures (either the first aperture, the second aperture or both) with alternative shapes, such as ellipses, rectangles, etc., enabling to define different areas and orientations where shooting is allowed in each particular shooting range. Also, the apertures may be fully or partially covered by additional filters, substantially transparent to IR radiation, that reduce or block radiation from other frequency ranges, hence improving signal to noise ratio at the receiver 400. Any additional protective cover to prevent internal damage may also be included on the apertures, such as a methacrylate cover.

In this text, the term "comprises" and its derivations (such as "comprising", etc.) should not be understood in an excluding sense, that is, these terms should not be interpreted as excluding the possibility that what is described and defined may include further elements, steps, etc. Furthermore, In the context of the present disclosure, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, design decisions not related to the disclosure, etc. The same applies to the terms "about" and "around" and "substantially".

The invention claimed is:

1. A weapon safety system comprising:
   a target;
   a weapon;
   an emitter located in a surrounding region of the target; and
   a receiver attachable to the weapon;
   the weapon comprising an automated lock configured to prevent the weapon from being fired;
   wherein the emitter comprises:
   a light emitting diode for transmitting the clearance signal with an encoded identifier; and
   a first radiation-blocking element comprising a first aperture which restricts emission of the light emitting diode to a first beam; the first beam defining a first enablement area at the receiver in which the clearance signal is received in the receiver;
   wherein the receiver comprises:
   a photodetector for receiving and measuring an optical power of the clearance signal; the light emitting diode and the photodetector being aligned in an optimal shooting position in which the weapon is aiming at the target;
   receiver control means;
   wherein the receiver control means releases the automated lock and enables shooting when:
   the clearance signal is received by the receiver, so that the receiver is within the first enablement area;
   the measured optical power is above a first predefined threshold;
   the encoded identifier is validated; and if
   the measured optical power exceeds a second threshold, lower than the first threshold, and a preceding measurement of the optical power exceeds the first threshold.

2. The weapon safety system according to claim 1, wherein the receiver further comprises a second radiation-blocking element comprising a second aperture configured to restrict reception of the photodetector to a second beam; the second beam defining a second enablement area at the target; and wherein the receiver control means releases the automated lock if the weapon is aiming at the second enablement area.

3. The weapon safety system according to claim 1, wherein the emitter is disposed facing the receiver when the weapon is in the optimal shooting position.

4. The weapon safety system according to claim 1, wherein the emitter is disposed facing a reflector, which redirects the first beam to the receiver when the weapon is in the optimal shooting position.

5. The weapon safety system according to claim 1, wherein the first aperture is disposed perpendicularly to a vertical angle formed by an imaginary line separating the emitter and the receiver when the weapon is in the optimal shooting position.

6. The weapon safety system according to claim 1, wherein the emitter comprises a plurality of switches where the encoded identifier can be manually introduced by a user.

7. The weapon safety system according to claim 6, wherein the safety system comprises a plurality of sequential targets, being each consecutive target associated to an emitter with a different identifier, and in that the receiver control means releases the automated lock only if the identifiers are received in a predetermined sequence.

8. The weapon safety system according to claim 1, wherein the safety system comprises a plurality of targets of a plurality of shooting lanes, being each consecutive target associated to a single emitter having an identifier or to respective emitters with a same common identifier, and in that the receiver control means of the receivers of all weapons is configured to verify the same common identifier.

9. The weapon safety system according to claim 1, wherein the safety system comprises a plurality of targets of a plurality of shooting lanes, being each target associated to a respective emitter, each emitter having a different identifier, and in that the receiver control means of the receivers of each weapon is configured to verify an identifier of a shooting lane associated to said weapon.

10. The weapon safety system according to claim 1, wherein the receiver comprises an accelerometer, the receiver control means releases the automated lock also as a function of an orientation of the weapon measured by the accelerometer.

11. The weapon safety system according to claim 1, wherein the first aperture is a circular-shaped aperture.

12. The weapon safety system according to claim 1, wherein the second aperture is a circular-shaped aperture.

13. The weapon safety system according to claim 1, wherein the second aperture has a shape of a circular segment having as lower boundary an arc embracing more than 200°.

14. The weapon safety system according to claim 1, wherein the light emitting diode is a non-visible light emitting diode.

15. The weapon safety system according to claim 1, wherein the emitter comprises a filter covering the first aperture, where the filter reduces radiation outside a range emitted by the light emitting diode.

16. The weapon safety system according to claim 1, wherein the receiver comprises a filter covering the second aperture, where the filter reduces radiation outside a range emitted by the light emitting diode.

17. The weapon safety system according to claim 1, wherein the emitter further comprises emitter control means to modulate the clearance signal.

* * * * *